(12) United States Patent
Small et al.

(10) Patent No.: US 6,240,941 B1
(45) Date of Patent: Jun. 5, 2001

(54) MODULAR, INTERCONNECTABLE VALVE

(75) Inventors: Steven D. Small; Gene L. Pecci, both of Novato, CA (US)

(73) Assignee: Laars, Inc., Newport Beach, CA (US)

( * ) Notice: Subject to any disclaimer, the term of this patent is extended or adjusted under 35 U.S.C. 154(b) by 0 days.

(21) Appl. No.: 09/121,420

(22) Filed: Jul. 23, 1998

(51) Int. Cl.[7] .................................................. F16K 51/00
(52) U.S. Cl. .............................. 137/1; 137/269; 137/270; 137/595
(58) Field of Search .................................. 137/269, 595, 137/270, 1, 271

(56) References Cited

U.S. PATENT DOCUMENTS

| | | |
|---|---|---|
| 1,244,552 | 10/1917 | Shelor . |
| 1,270,722 | 6/1918 | Gillette . |
| 2,145,132 | 1/1939 | Riney et al. . |
| 2,766,771 | 10/1956 | Wenzel . |
| 3,233,865 | 2/1966 | Panzica et al. . |
| 3,489,178 | 1/1970 | Kice . |
| 3,595,270 | 7/1971 | McNeal, Jr. . |
| 3,938,553 | 2/1976 | Ortega . |
| 4,137,934 | * 2/1979 | Rice et al. ............................ 137/270 |
| 4,655,252 | 4/1987 | Krumhansl . |
| 4,774,977 | * 10/1988 | Cohen ............................. 137/595 X |
| 5,427,141 | * 6/1995 | Ohtsubo ............................... 137/595 |
| 5,437,304 | * 8/1995 | Delcroix ............................... 137/595 |
| 5,642,756 | * 7/1997 | Lawrence et al. ............... 137/271 X |

* cited by examiner

Primary Examiner—Kevin Lee
(74) Attorney, Agent, or Firm—Buchanan Ingersoll, P.C.

(57) ABSTRACT

A valve is disclosed. The valve includes at least two valve bodies that each have an annular chamber for operably supporting a flow control member. An adjoining member is attached between the valve bodies and houses an adaptor for engaging a portion of each flow control member such that rotation of one flow control member rotates the other flow control member. Each flow control member can engage the adaptor at a plurality of orientations about an actuation axis that extends through the valve. A method for reorienting to interconnected valve bodies relative to each other is disclosed.

64 Claims, 15 Drawing Sheets

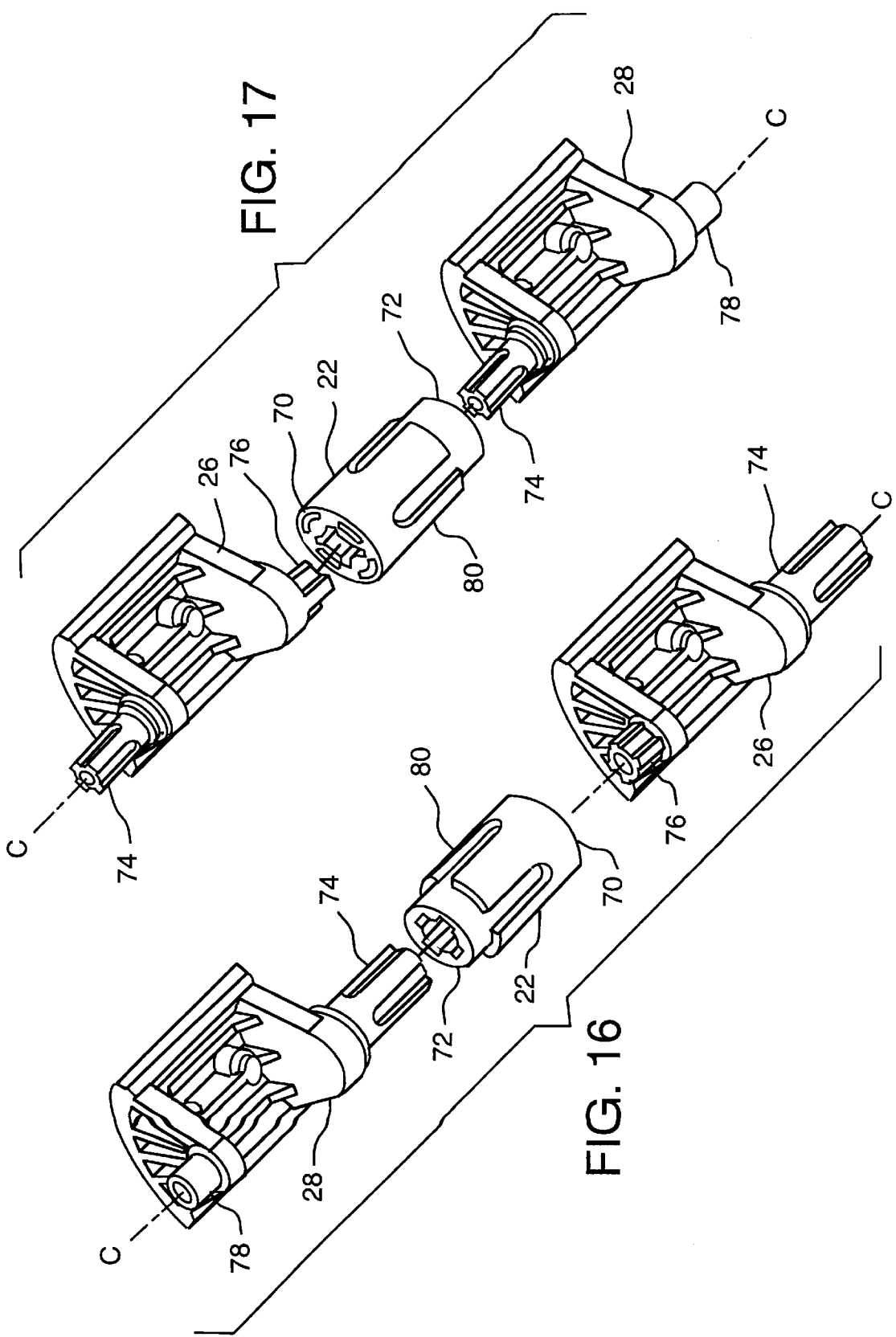

MODULAR, INTERCONNECTABLE VALVE

CROSS-REFERENCE TO RELATED APPLICATIONS

Not Applicable.

FEDERALLY SPONSORED RESEARCH

Not Applicable.

BACKGROUND OF THE INVENTION

1. Field of the Invention

The present invention relates to valves and, more particularly, to interconnectable valves for use in controlling flow of fluids within pipelines and other conduits.

2. Description of the Invention Background

A variety of different valves have been developed for controlling fluid flow through pipelines. Most valves, regardless of type, comprise a housing member that operably supports a flow control member therein. The housing typically has two or more ports that are constructed for attachment to corresponding portions of pipelines. Some ports are provided with threaded connections, while others utilize a "slip fit" connection wherein a section of pipeline is slidably received in a socket formed in the valve housing. The pipe is typically retained within the socket by an appropriate attachment medium or adhesive. For example, the pipe may be affixed to the socket by welding, soldering or gluing.

The flow control characteristics afforded by a valve are generally dependent on the type of flow control member employed and the configuration of the ports. In many pipeline applications, it is desirable to utilize valves that divert fluid flow from one port to another. In those instances, diverting valves are usually employed. For example, water flow from a water heater may be diverted to either a pool or a spa by way of a diverting valve.

A number of differently configured diverting valves exist for diverting fluid flow. One type of diverting valve utilizes a "ball" or "disc" that essentially fills the core of the valve body except for a flow passage provided through the ball or disc. The ball or disc is rotatably supported within the valve body and is adapted to sealingly engage a seat adjacent to the ports of the valve such that flow occurs only through the ports that are aligned with the flow passage. Another type of diverting valve utilizes a diverter that sealingly engages a seat adjacent to a port so as to prevent flow through that port. The diverter is also rotatably supported within the valve body such that the diverter may be rotated so as to prevent flow through a port when in one position and permit flow through that port in another position. Thus, ball, disc and diverter type valves may be utilized to divert flow by rotating the ball, disc or diverter to seal the port or ports through which flow is not desired while permitting flow through other ports.

In other applications, it is desirable to utilize "shut off" valves that selectively permit or prevent fluid flow through the valve. Ball or disc and diverter type valves have also been configured to serve as shut off valves.

Depending upon the application, at times it may be desirable to utilize valves with different numbers of ports and different port configurations. For example, in certain pipeline arrangements, it is desirable to have a valve configured with two ports. Two port shut off valves are commonly used to selectively permit or prevent flow from a first conduit to a second conduit. In other pipeline applications, it is desirable to have a valve configured with three ports. When using such a valve, fluid flow from a first conduit may be selectively routed to either a second conduit or a third conduit by properly orienting a diverter member supported within the valve housing. In yet another pipeline application, it is desirable to have a valve configured with four ports. A four port diverting valve may be utilized to permit flow from a first conduit to a second conduit in a first position and flow from a third conduit to a fourth conduit in a second position.

It may also be useful to interconnect multiple valve bodies together into a single "stacked valve" in certain pipeline applications. In those applications, the valve bodies are coupled, or "stacked", perpendicularly to the direction of fluid flow. In certain stacked valve arrangements, it may be desirable for the flow control members of each valve to be interconnected and commonly actuatable. Thus multiple sources of flow may be diverted and/or shut off simultaneously.

While such valves can effectively divert or shut off fluid flow through a pipeline, conventional stacked valve designs have various shortcomings. A certain conventional stacked valve permits the valve bodies and flow control members to be rotated in relationship to one another. A valve of that type, however, has no separator between the valve bodies or flow control members and requires that a weld, which holds the valve bodies together, be removed in order to accomplish the rotation. Of course, after rotation, the valve bodies must be welded to reconnect them into a single unit. Such assembly and disassembly procedures are costly and time consuming which can lead to undesirable downtime of the piping system. Another conventional stacked valve requires that a spring detent be modified in order to properly locate the plugs of the valve when the valve bodies are rotated.

It will be appreciated that while interconnecting valves can make field installation more efficient, by allowing pre-configuration of what would have been multiple parts in a conventional system, changes are sometimes required to meet varying field conditions. Such field changes to conventional stacked or interconnected valves are, however, typically time consuming and costly in the form of labor expenses and production downtime.

Also, in many pipeline applications, to obtain desired flow control capabilities, it is necessary to provide fluid to flow from one valve to another. Flow between valves has previously been accomplished by providing conduit to form an external pipeline that connects a port of one valve to the ports of one or more other valves. As may be appreciated, the piping materials and labor required for such external connections are costly and fabrication of the piping is time consuming. Using external piping to provide fluid flow from one valve to another also requires that each valve be provided with an additional port for connection to the external piping.

Thus, there is a need for a valve in which the valve bodies may be readily connected in multiple configurations.

There is a further need for a valve in which multiple flow control members may be connected in multiple configurations to achieve desired flow control capabilities.

Additionally, there is a need for a modularly interconnectable valve in which valve bodies and diverters may be independently reconfigured to efficiently and conveniently accommodate varying field conditions.

There is also a need for an interconnected valve that permits flow between valve bodies without the need for external connections.

SUMMARY OF THE INVENTION

The present invention is directed to a valve. The valve includes at least two valve bodies, each valve body having an annular chamber and at least one port therethrough. The valve also includes an adjoining member extending intermediate the valve bodies and removably attached to the valve bodies and a flow control member operably disposed in the annular chamber of each valve body. The valve may also include a rotatable adaptor received within the adjoining member and engaging the flow control members.

In one embodiment of the valve, the flow control members are engagable with the adaptor in a plurality of orientations about an actuating axis extending through the valve. In another embodiment, the valve bodies of the valve are engageable with the adjoining member in a plurality of orientations about the actuating axis.

In yet another embodiment of the valve the adjoining member has a flow passage in fluid communication with the annular chambers of the valve bodies.

Another embodiment of the present invention is directed to a valve having an actuating axis and a first valve body that includes at least one port and an annular chamber, the annular chamber extending from a first flange to a second flange and coaxially aligned with the actuating axis. The valve also has a second valve body that includes at least one port and an annular chamber, the annular chamber extending from a first flange to a surface and coaxially aligned with the actuating axis. The valve also includes a first flow control member disposed in the annular chamber of the first valve body and coaxially aligned with, and rotatable along, the actuating axis. The valve further includes a second flow control member disposed in the annular chamber of the second valve body and coaxially aligned with, and rotatable along, the actuating axis. The valve also includes an adjoining member coaxially aligned with the actuating axis and connected to the second flange of the first valve body and the first flange of the second valve body. The valve furthermore includes an adaptor, corresponding to each adjoining member and housed therein, that is coaxially aligned with and rotatable along the actuating axis and is connected to the first and second control members. The valve also includes a cover connected to the first flange of the first valve body.

Another embodiment of the present invention has at least two valve bodies and means for connecting the valve bodies such that each valve body may be removed from the means.

Yet another embodiment of the present invention is directed to a valve having two ported valve bodies that includes a flow control member operably supported in one of the valve bodies, the flow control member having at least one actuator stem. The valve also includes another flow control member operably supportable in the other valve body, the another flow control member also having at least one actuator stem. In addition, the valve has a connector extending between the valve bodies and attachable to the valve bodies. The connector engages one of the actuator stems on the flow control member and one of the actuator stems on another flow control member.

The present invention is also directed to a method for reorienting an interconnected valve that includes disconnecting an adjoining member from a valve body, rotating the valve body with respect to the adjoining member and reconnecting the valve body to the adjoining member.

The present invention offers the features of permitting connection of valve bodies and flow control members in multiple configurations. Another feature of the present invention is to permit ready reconfiguration of valve bodies and flow control members. The present invention also offers the feature of providing flow between interconnected valves without the necessity of an externally connected conduit pipeline. Accordingly, the present invention provides solutions to the shortcomings of conventional valve arrangements. Those of ordinary skill in the art will appreciate, however, that these and other details, features and advantages will become further apparent as the following detailed description proceeds.

BRIEF DESCRIPTION OF THE DRAWINGS

In the accompanying Figures, there are shown present preferred embodiments of the invention wherein like reference numerals are employed to designate like parts and wherein:

FIG. 16 is an exploded assembly view of the adaptor of FIGS. 12–15 and diverters of the present invention as viewed from the bottom;

FIG. 17 is another exploded assembly view of the adaptor and diverters of FIG. 16 as viewed from the top;

DETAILED DESCRIPTION OF THE INVENTION

Figure 1:
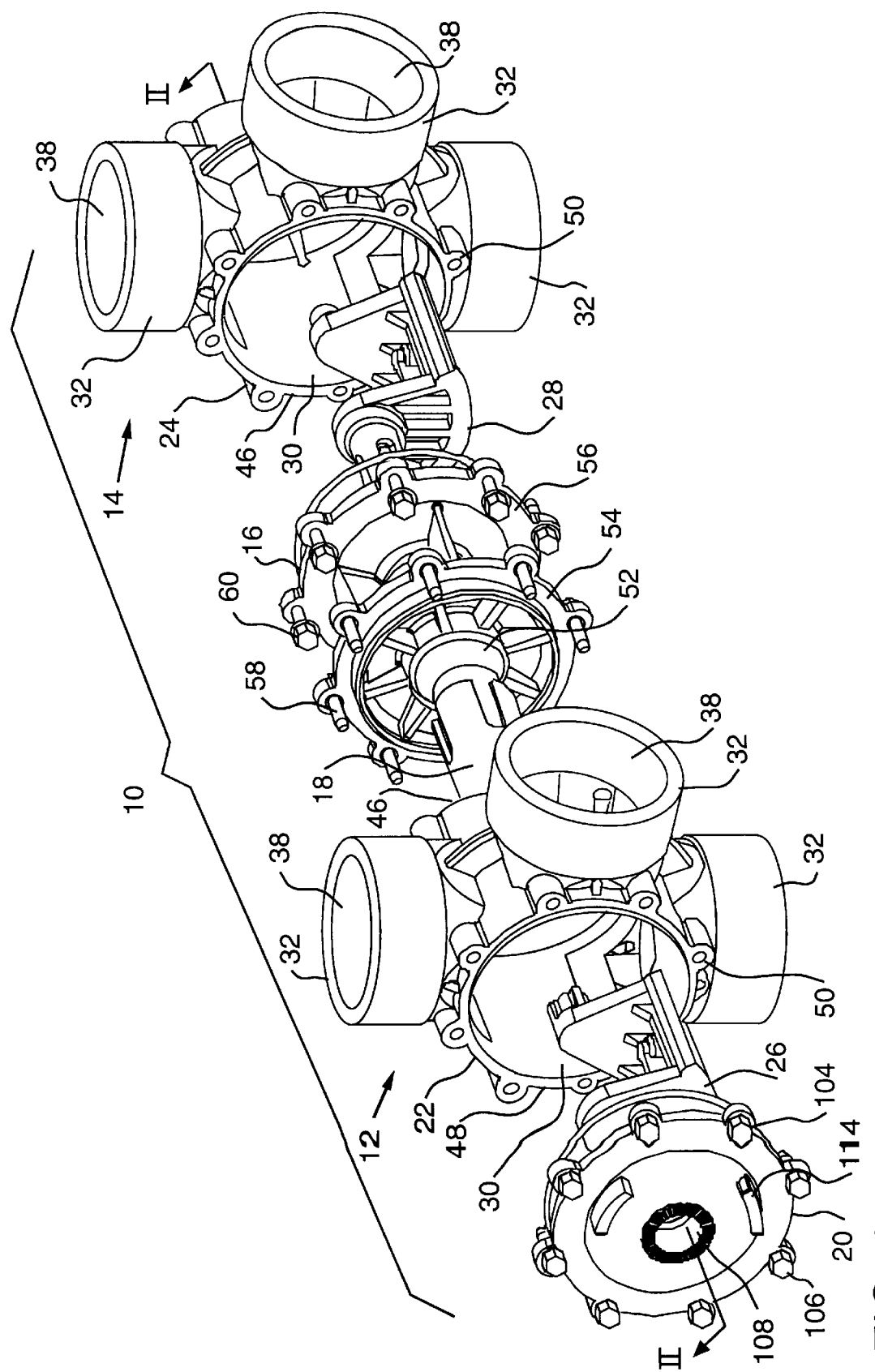
FIG. 1 is an exploded assembly view of a valve assembly of the present invention.
Figure 2:
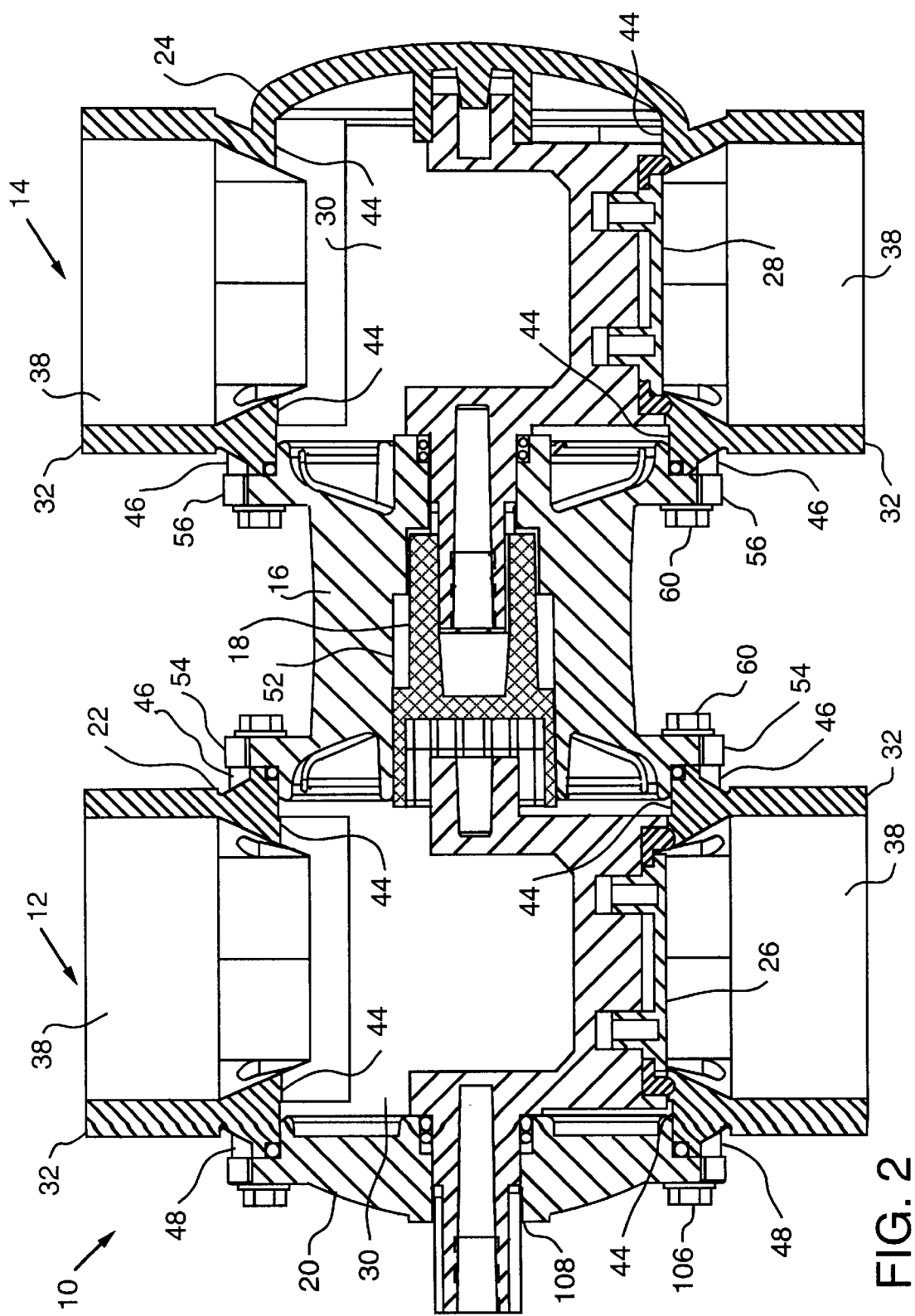
FIG. 2 is a cross-sectional elevational view of the assembled valve of FIG. 1 taken along line II—II in FIG. 1.

Referring now to the drawings for the purpose of illustrating present preferred embodiments of the invention only and not for the purpose of limiting the same, FIG. 1 shows an exploded perspective view of an interconnectable valve 10 and FIG. 2 illustrates an assembled cross sectional view of the same interconnectable valve 10 constructed in accordance with the present invention. The interconnectable valve 10 includes two valve assemblies 12 and 14, an adjoining member 16, an adaptor 18 and a cover 20. Each valve assembly (12, 14) may comprise a valve body (22, 24) and a diverter (26, 28). Each of those portions of the assembly may be fabricated from many materials including plastic, steel, iron, stainless steel, brass and bronze. The skilled artisan will readily appreciate that the materials from which the valve components described herein are fabricated may be advantageously selected based on their compatibility with the types of fluids being handled and the environment, including, for example, the pressure and temperature conditions, to which the valve 10 will be exposed. Furthermore, while the embodiment illustrated in FIG. 1 includes two valve assemblies 12 and 14 interconnected as a single unit, the invention may include additional valve assemblies as necessary to meet the requirements of a particular pipeline application. Thus, the present invention should not be limited to a dual-stacked valve arrangement.

Figure 3:
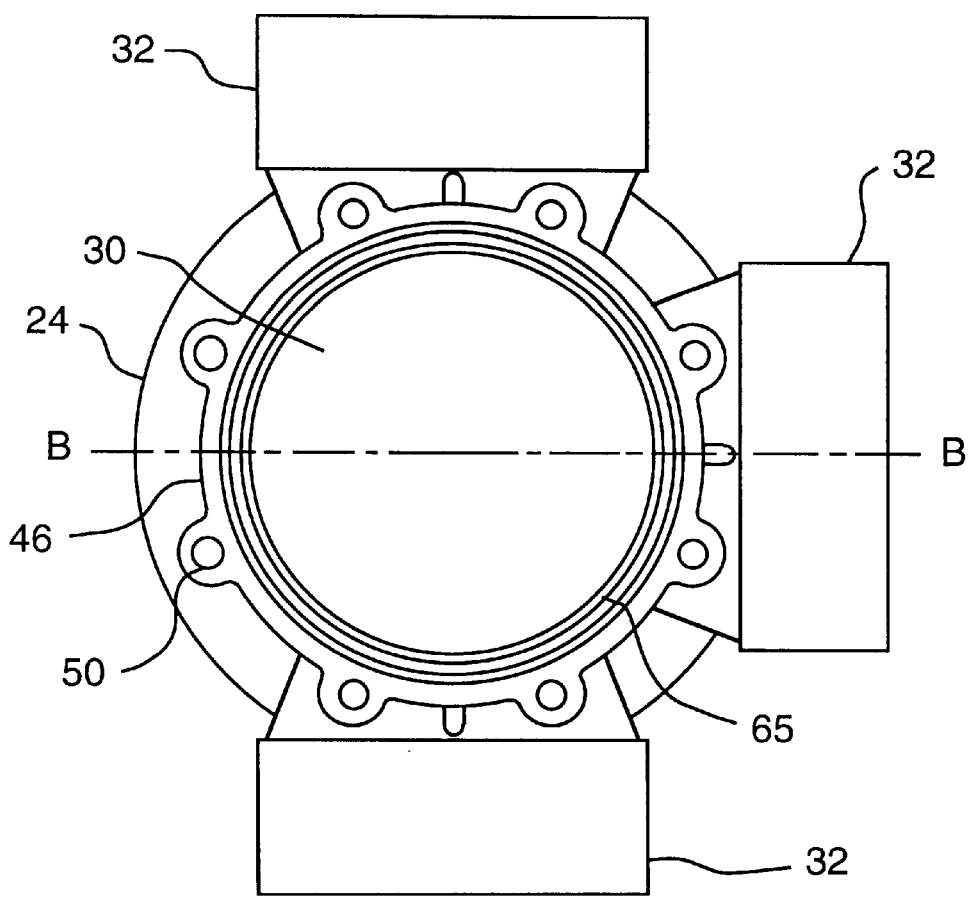
FIG. 3 is a top view of one of the valve bodies employed in the valve assembly of FIG. 1.
Figure 4:
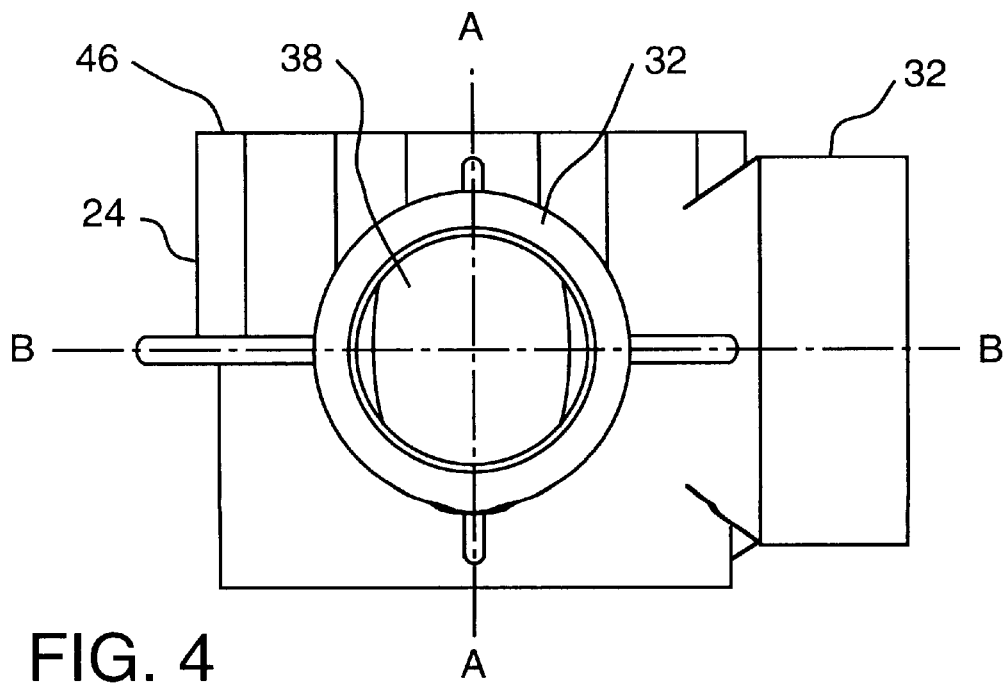
FIG. 4 is an elevational view of the valve body of FIG. 3.

FIGS. 3 and 4 illustrate a valve body 24 for directing fluid flowing through a pipeline system. The valve body 24 defines an annular chamber 30 and includes at least one coupling member 32 that defines at least one port 38 in the valve body 24. The embodiment illustrated includes three coupling members 32 defining three ports 38. Each coupling member 32 may include a seat 44 (illustrated in FIG. 2) for engagement with the diverter 28 to prevent flow through the associated port 38. The seat 44 may comprise a surface formed to engage the diverter 28 and serves to establish a fluid-tight seal between the valve body 24 and the diverter 28 when the diverter 28 engages the seat 44. The coupling members 32 are adapted to facilitate attachment of the valve body 24 to fluid-carrying conduits (i.e., sections of pipeline, etc.). In the embodiment depicted, coupling members 32 comprise slip fit couplers and the conduits are retained in their respective coupling members 32 by an appropriate attachment medium, such as an adhesive manufactured by IPS Corporation of Gardena, Calif. 90248. Conduits may alternatively be attached to the coupling members 32 by welding or by threaded or compression connections.

The valve body 24 also contains a flange 46, having an axis A—A generally perpendicular to the axis B—B of the ports 38, for connection to another valve component such as an adjoining member 16 or cover 20. The valve body may have a second flange 48 opposite the first flange 46 for connection to another valve component, as is illustrated by valve body 22 in FIGS. 1 and 2. Alternately, the valve body may be closed opposite the first flange 46, as is illustrated by valve body 24. The flanges 46 and 48 may include a plurality of threaded holes 50 to facilitate connection to another valve component. Valve bodies (22, 24) having various numbers of ports 38 and various port configurations may have similar flanges 46 and 48 so that many configurations of valve bodies (22, 24) may be connected together.

Figure 5:
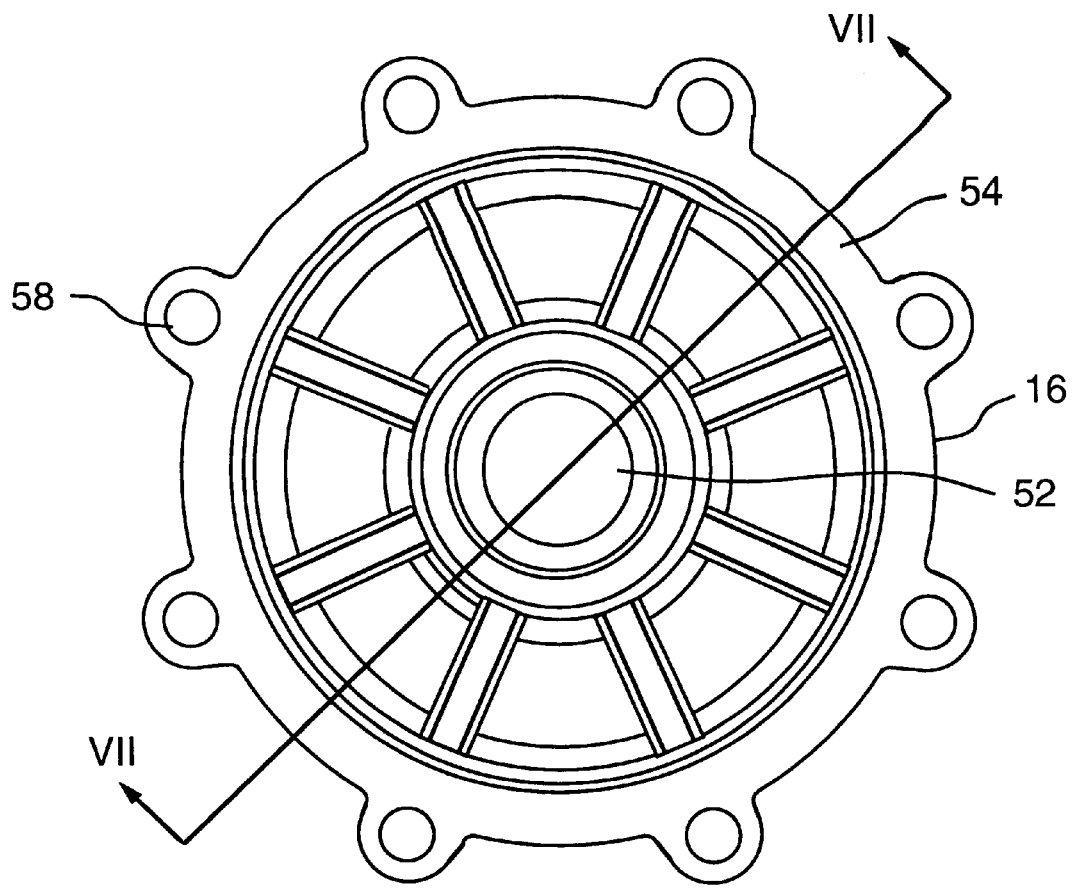
FIG. 5 is a top view of an adjoining member of the present invention.
Figure 6:
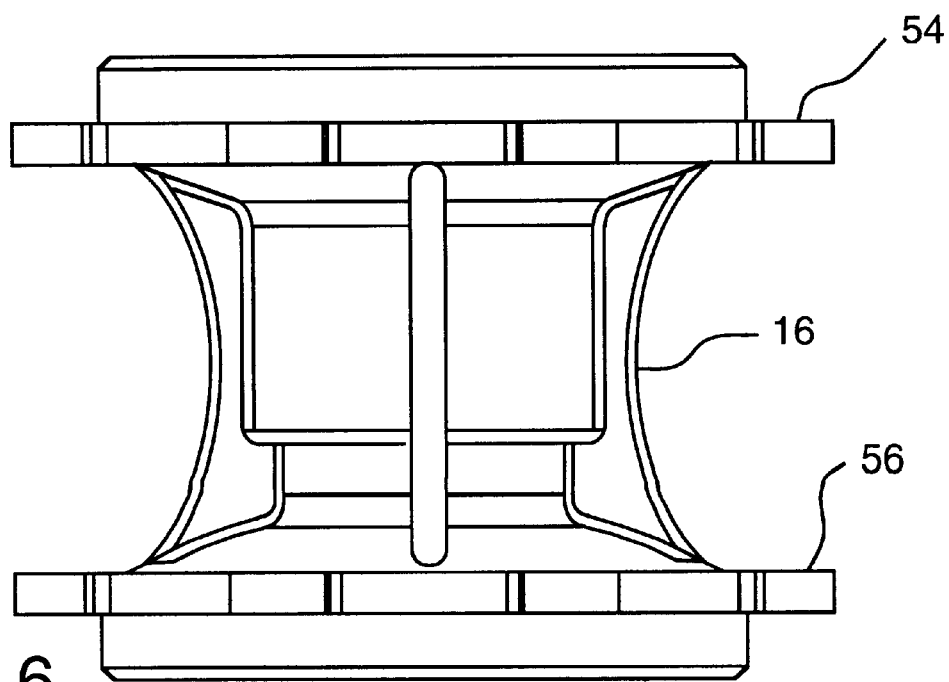
FIG. 6 is an elevational view of the adjoining member of FIG. 5.
Figure 7:
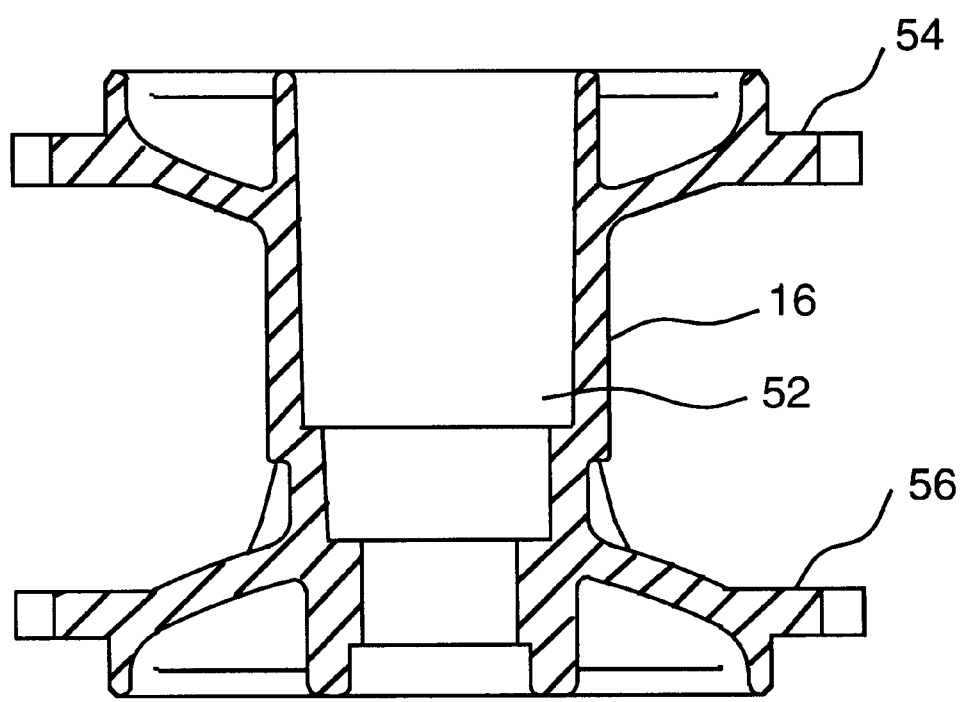
FIG. 7 is a cross-sectional view of the adjoining member of FIG. 5, taken along line VII—VII in FIG. 5.
Figure 8:
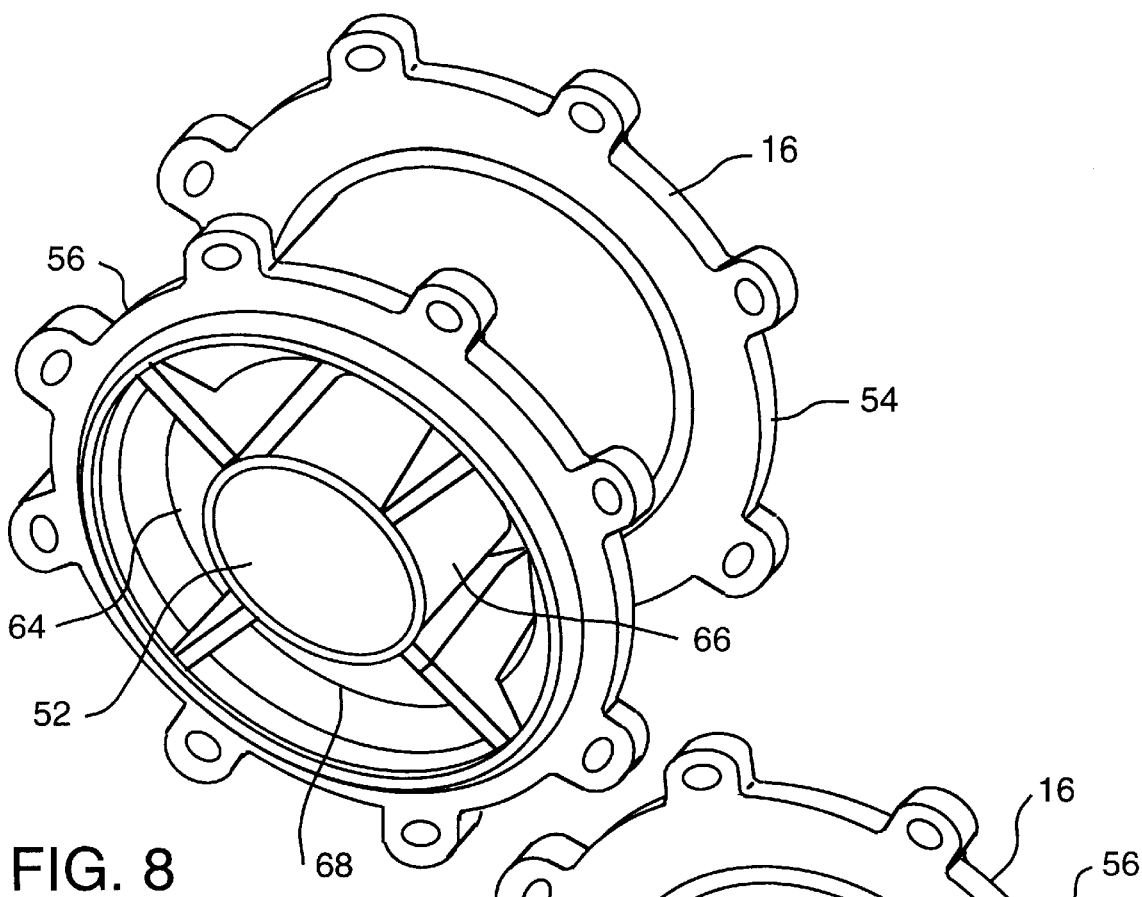
FIG. 8 is an end perspective view of another embodiment of the adjoining member of the present invention.
Figure 9:
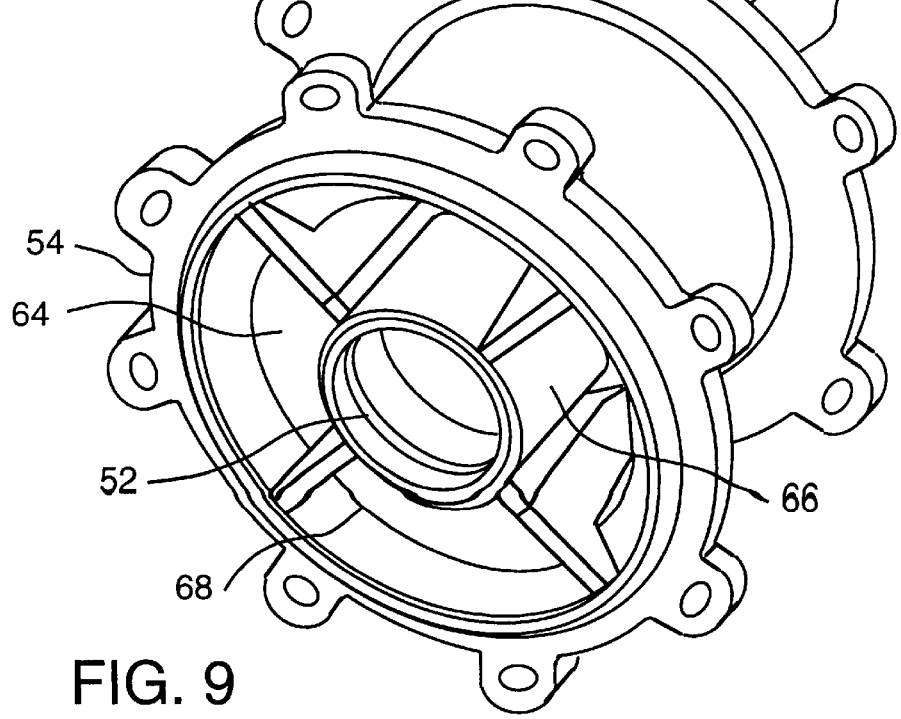
FIG. 9 is a perspective view of the opposite end of the adjoining member of FIG. 8.
Figure 10:
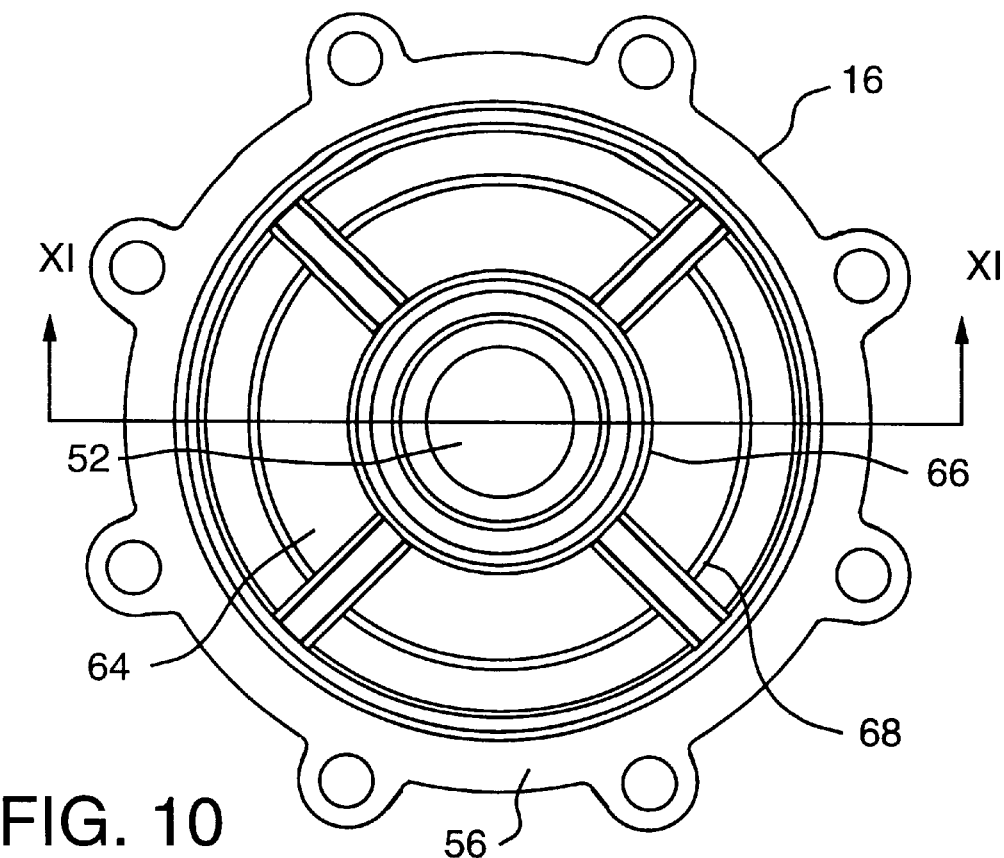
FIG. 10 is a top view of the adjoining member of FIG. 8.
Figure 11:
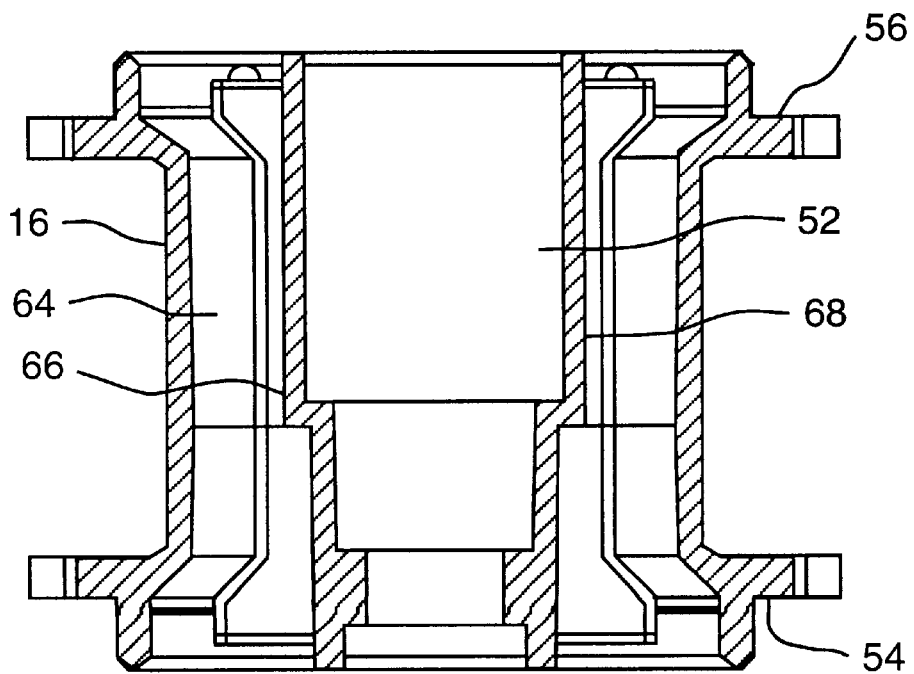
FIG. 11 is a cross-sectional, elevational view of the adjoining member of FIG. 10, taken along line XI—XI in FIG. 10.
Figure 12:
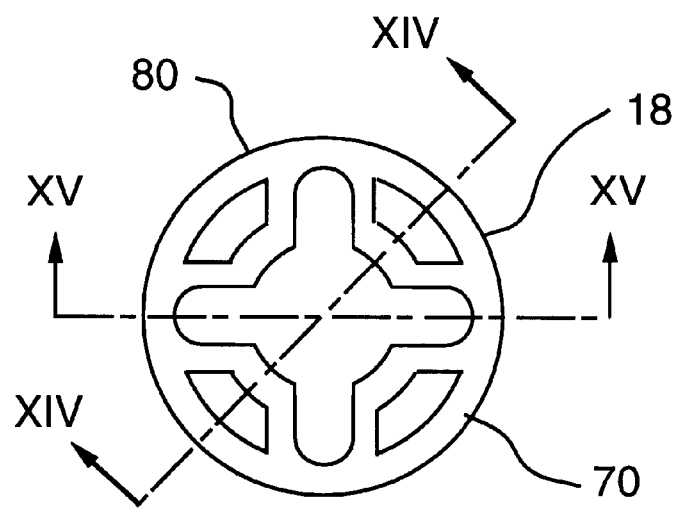
FIG. 12 is a top view of an adaptor of the present invention.
Figure 13:
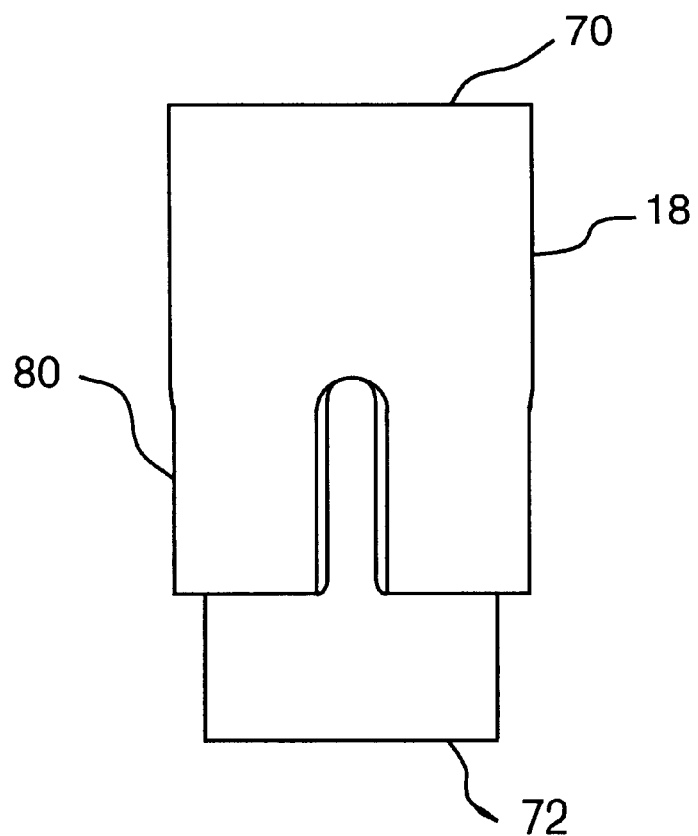
FIG. 13 is an elevational view of the adaptor of FIG. 12.
Figure 14:
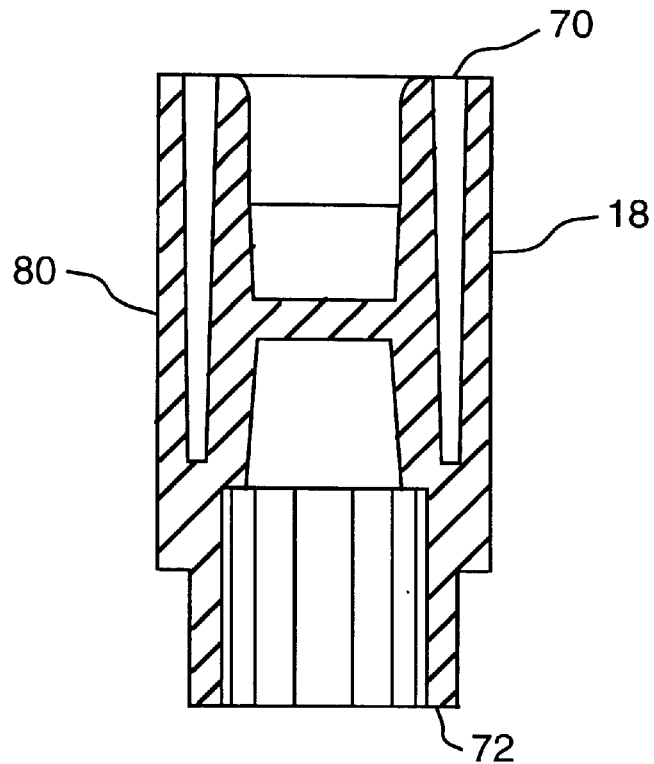
FIG. 14 is a cross-sectional view of the adaptor of FIG. 12, taken along line XIV—XIV in FIG. 12.
Figure 15:
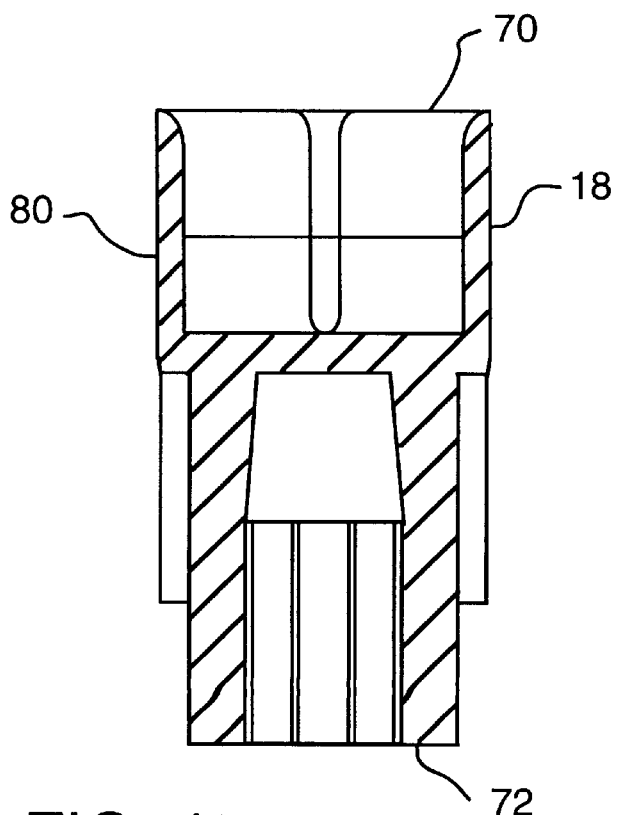
FIG. 15 is a cross-sectional view of the adaptor of FIG. 12, taken along line XV—XV in FIG. 12.

FIGS. 5–7 illustrate an adjoining member 16 which may be used to connect two valve assemblies 12 and 14 to form an interconnected valve 10, as illustrate in FIGS. 1 and 2. The adjoining member 16 defines an annular channel 52 and two opposing flanges 54 and 56, that are adapted to interchangeably engage the flanges 46 and 48 on either of the valve bodies 22 and 24. The adjoining member flanges 54 and 56 also may include a plurality of holes 58 through which bolts 60 pass for removable connection to the valve bodies 22 and 24. The holes 58 may be arranged in a symmetrical pattern around the circumference of the adjoining member 16 to enable the adjoining member 16 to be connected to the valve bodies 22 and 24 in a variety of positions. Such connection is accomplished by aligning the holes 58 with threaded holes 50 in the bodies 22 and 24 and utilizing bolts 60 to complete the connection. The reader will appreciate that such attachment arrangement also facilitates quick assembly and disassembly of valve components. Other means of fastening that permit ease of disconnecting and reconnecting, preferably with standard hand tools, may be utilized in place of the flange 46 and bolts 60 described herein. With the bolts 60 removed, the adjoining member 16 can be rotated relative to each valve body 22 and 24 until the valve bodies 22 and 24 are oriented in the desired position and the holes 50 of each adjoining member flange 54 and 56 align with the threaded holes 50 of the valve bodies 22 and 24 to facilitate reattachment of the adjoining member 16 to the valve bodies 22 and 24. If finer adjustment is required, slots may be utilized in place of holes 58 in the flanges 54 and 56. The position of each valve body (22, 24) in an interconnected valve 10 may be thereby adjusted with respect to every other valve body (22, 24) in that unit. Additional valve assemblies (12, 14) may be combined into the unit by connecting additional adjoining members 16 and valve bodies in series. In one embodiment, a gasket (not shown) is positioned between the adjoining member 16 and each of the valve bodies 22 and 24 to achieve a fluid-tight seal.

FIGS. 8–11 illustrate an alternative embodiment of the adjoining member 16 wherein a flow passage 64 is provided in the adjoining member 16 to permit flow between the valve bodies 22 and 24. As may be seen in FIG. 3, the valve body 22 may have an opening 65 to the annular chamber 30 at the flange (46, 48) to which the adjoining member 16 is attached. Therefore, when an adjoining member 16 having a flow passage 64 is attached to two valve bodies 22 and 24, fluid may flow from the annular chamber 30 of the first valve body 22 through the flow passage 64 in the adjoining member 16 to the annular chamber 30 of the second valve body 24. The flow passage 64 may be provided in various orientations through the adjoining member 16. In the embodiment illustrated in FIGS. 8–11, the flow passage 64 is defined by a wall 66 surrounding the annular channel 52 and an outer wall 68 of the adjoining member 16. Those of ordinary skill in the art will appreciate that by utilizing the flow passage 64, fluid flowing through inlet port 38 of the first valve body 22 can pass to the annular chamber 30 of the second valve body 24 without the need for additional port connections on valve bodies 22 and 24.

FIGS. 12–15 illustrate an adaptor 18 for coupling the diverters 26 and 28 of the valve 10 as illustrated in FIG. 1. The adaptor 18 may be rotatably disposed in the annular channel 52 of the adjoining member 16. The adaptor 18 may be keyed at a first end 70 that extends toward the first valve body 22 when placed in the annular channel 52 of the adjoining member 16 and may also be keyed at a second end 72 that extends toward the second valve body 24 when placed in the annular channel 52 of the adjoining member 16. The keyed ends 70 and 72 of the adaptor 16 are configured to slidably engage a portion of the first diverter 26 and the second diverter 28.

Figure 18:
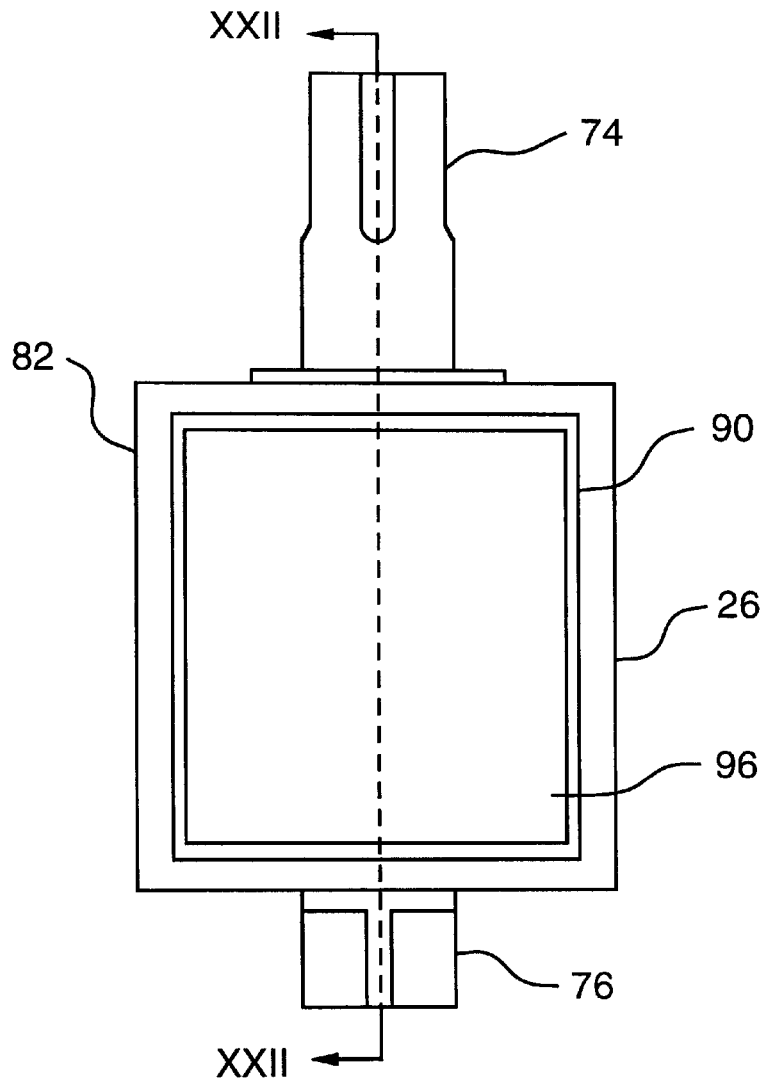
FIG. 18 is a front elevational view of a diverter of the present invention.
Figure 19:
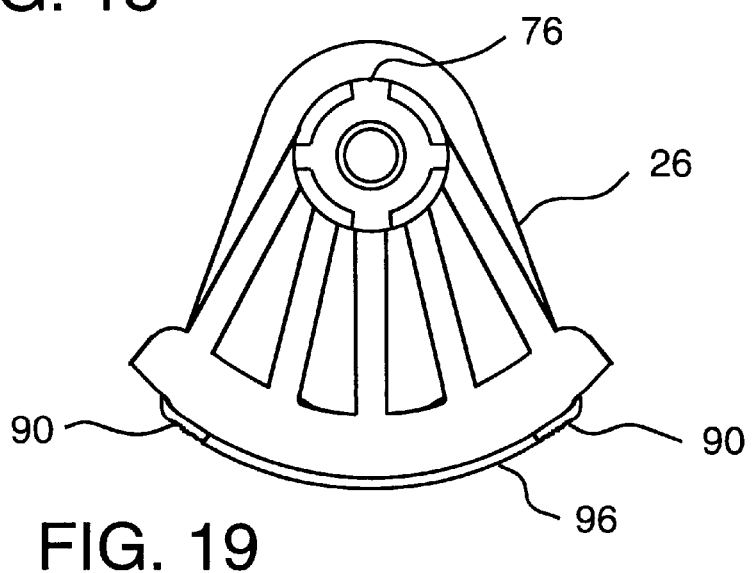
FIG. 19 is a bottom view of the diverter of FIG. 18.
Figure 20:
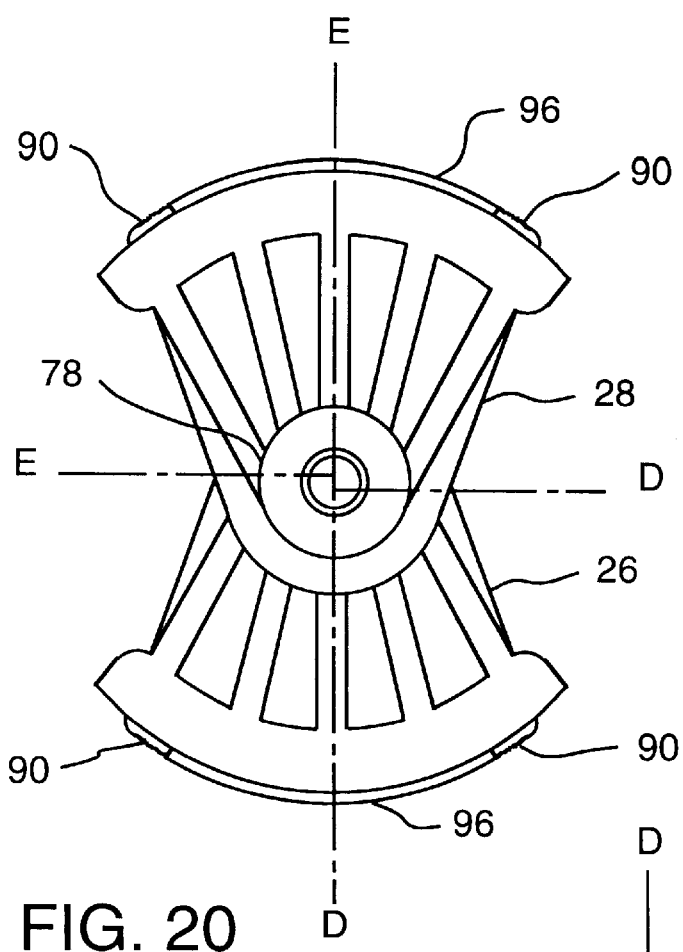
FIG. 20 is a bottom view of the first and second diverters of the present invention oriented at 180° with respect to each other.
Figure 21:
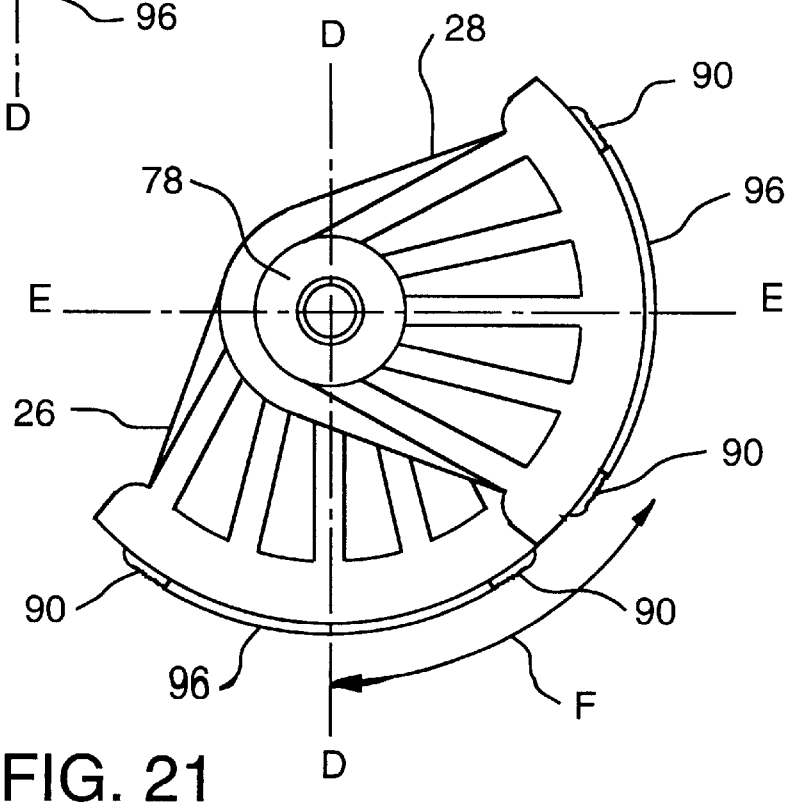
FIG. 21 is a bottom view of the first and second diverters of FIG. 20 oriented at 90° with respect to each other.

FIGS. 16–22 illustrate the first and second diverters 26 and 28 which are utilized to selectively prevent or divert flow through portions of the valve bodies 22 and 24. FIGS. 16 and 17 are exploded perspective views of the first and second diverters 26 and 28 and the adaptor 22. FIGS. 18 and 19 depict an embodiment of the first diverter 26. The diverters 26 and 28 each have a primary stem 74 and an auxiliary stem 76 and 78. The primary stems 74 of first diverter 26 and second diverter 28 are keyed for non-rotatable complimentary engagement with the adaptor 18 in a plurality of orientations about actuator axis C—C. The key arrangement of the primary stem 74 may also complimentarily engage an actuator for rotating the diverters (26, 28) of the interconnected valve 10. The auxiliary stem 76 of the first diverter 26 is intended to non-rotatably engage the adaptor 18, and so is keyed for complimentary engagement with the adaptor 18 in a plurality of orientations about actuator axis C—C. The auxiliary stem 78 of the second diverter 28 is intended to rotatably engage the second valve body 24 and, therefore, is configured for complimentary engagement with the second valve body 24. Each keyed stem 74 and 76 may be arranged in a symmetrical pattern such that the diverters (26, 28) may be disengaged from, rotated with respect to, and slidably re-engaged with, the adaptor 18 in a plurality of axial orientations. By repositioning the stems 74 and 76 relative to the adaptor 18, the diverters 26 and 28 may be placed in a plurality of configurations with respect to each other. FIG. 20 illustrates first diverter 26, having diverter axis D—D, and second diverter 28, having diverter axis E—E, oriented at about a 180° angle with respect to each other. FIG. 21 illustrates an alternative orientation, wherein first diverter 26, having diverter axis D—D, and second diverter 28, having diverter axis E—E, are oriented at about a 90° angle with respect to each other. The purpose of this unique capability will be discussed in further detail below.

The adaptor ends 70 and 72 (see FIGS. 14 and 15) may have the same key configuration and the primary and auxiliary stems 74 and 76 may have the same key configuration to facilitate interconnection in a plurality of configurations. Alternatively, the first and second ends 70 and 72 of the adaptor 18 may be keyed differently. For example, the first end 70 of the adaptor 18 may be keyed such that it will engage the auxiliary stem 76 of the first diverter 26 and the second end 72 of the adaptor 18 may be keyed such that it will engage the primary stem 74 of the first and second diverters 26 and 28. The outer surface 80 of the adaptor 18 may also be shaped such that it will engage the annular channel 52 of the adjoining member 16 in a single alignment. That alternative embodiment ensures that those components are oriented in a predetermined configuration when assembled.

The adaptor 18 may be fastened to the keyed diverter stems (74, 76) by way of locking mechanisms, such as, for example, set screws (not shown), to prevent movement of the stems (74, 76) with respect to the adaptor 18, in place of or in addition to the keyed arrangement discussed hereinabove. Where no locking mechanism is utilized, movement of the diverter (26, 28) may be limited by utilizing a diverter (26, 28) that is sized such that its movement in the direction of the actuator axis C—C is minimized when the diverter (26, 28) is operably disposed in the annular chamber 30 of the valve body 22.

When assembled, the diverters (26, 28) are placed in the valve bodies (22, 24). Each diverter (26, 28) has a diverter axis (D—D, E—E) along which the diverter (26, 28) extends to engage its associated valve body (22, 24). Each diverter (26, 28) may be rotated to selectively and sealingly engage the corresponding seats 44 of a coupling member 32 to prevent flow through the associated port 38. The diverters (26, 28) may be rotated so as to partially block a corresponding port 38 in their respective valve bodies (22, 24), thereby reducing the amount of flow passing through that port 38. In the alternative, the diverters (26, 28) may be rotated within their respective valve bodies (22, 24) to permit unimpeded fluid flow therethrough. The diverters (26, 28) may also be used to block or partially block flow through more than one port 38 in their respective valve bodies (22, 24) at a time. Each valve body (22, 24) or diverter (26, 28) may also be provided with a stop (not shown) to prevent a diverter (26, 28) from being rotated about actuation axis C—C beyond a desired position.

Figure 22:
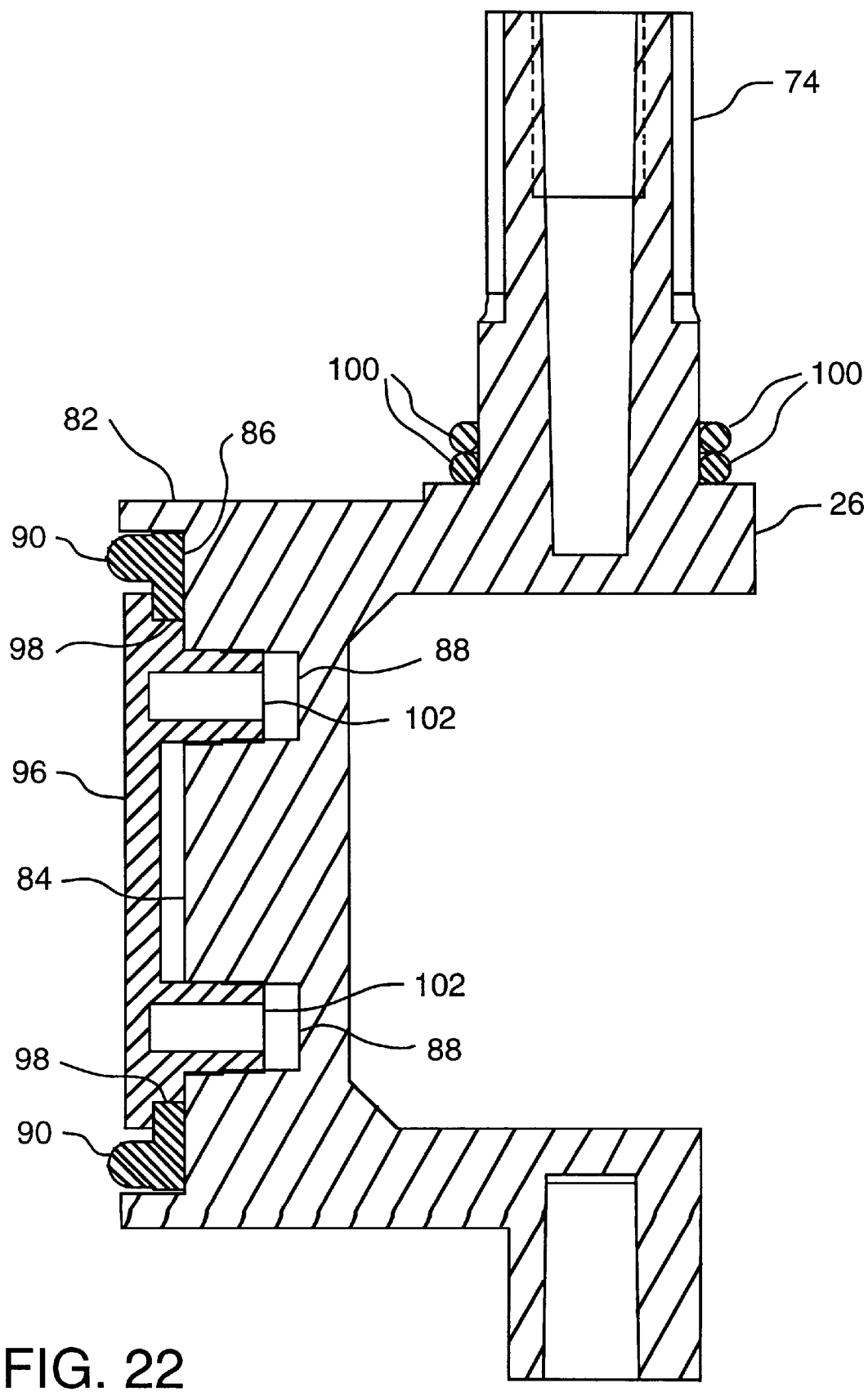
FIG. 22 is a cross-sectional view of the diverter of FIG. 18, taken along line XXII—XXII in FIG. 18.
Figure 23:
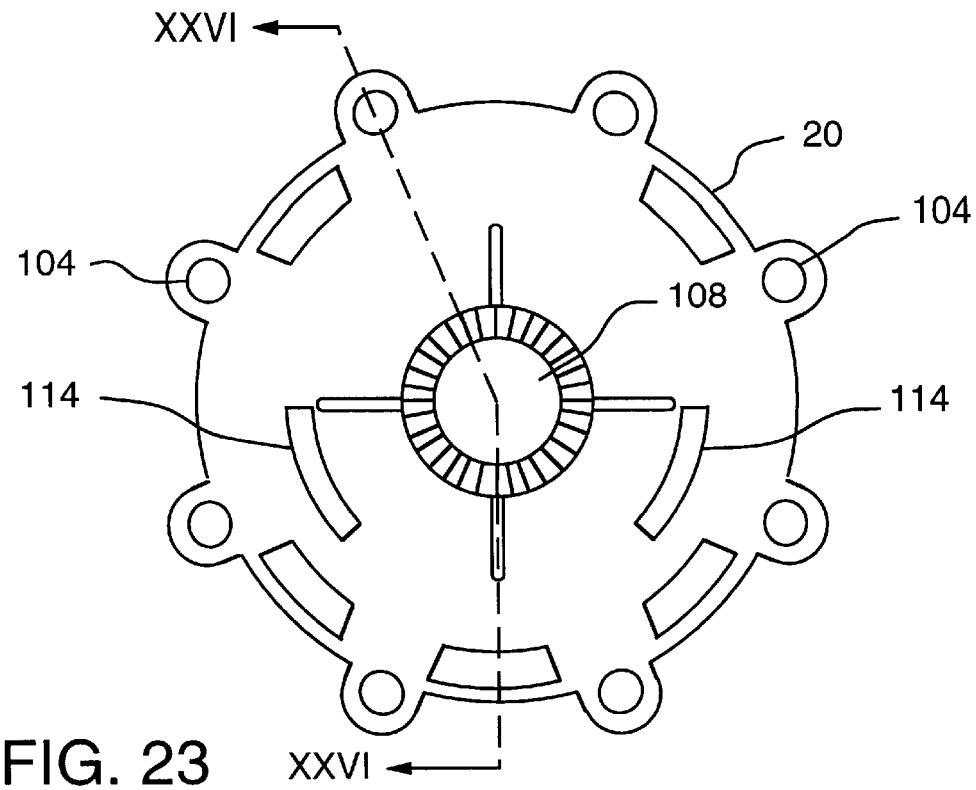
FIG. 23 is a top view of a cover of the present invention.
Figure 24:
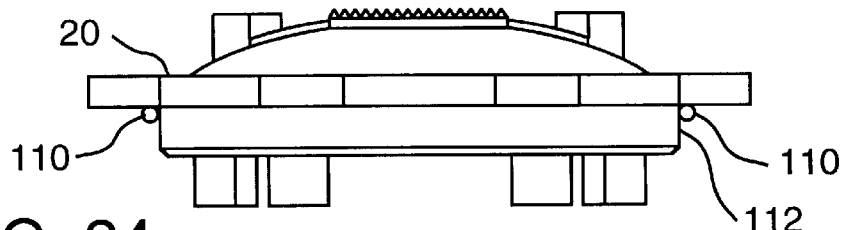
FIG. 24 is an elevational view of the cover of FIG. 23.
Figure 25:
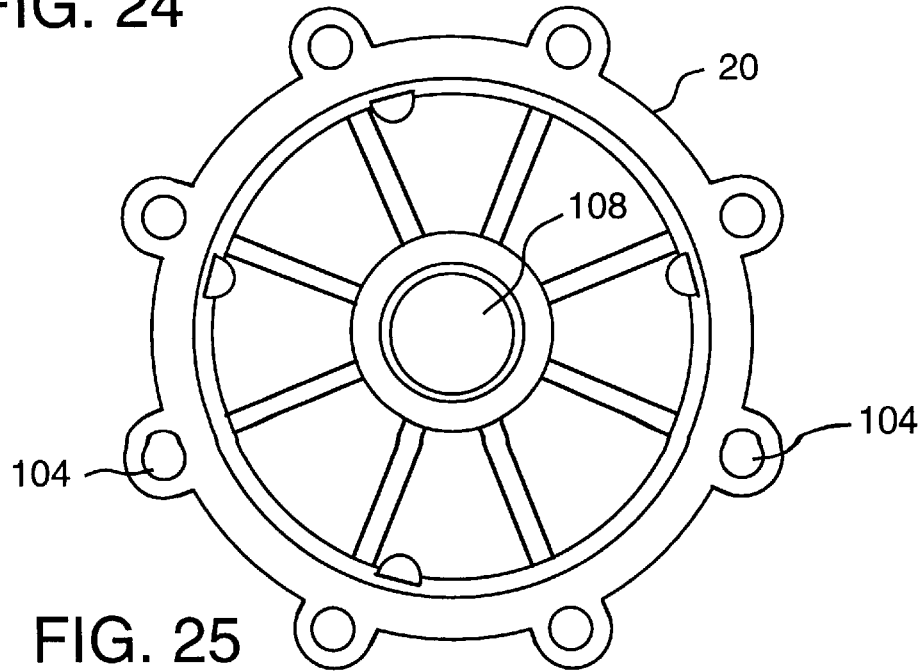
FIG. 25 is a bottom view of the cover of FIGS. 23 and 24.
Figure 26:
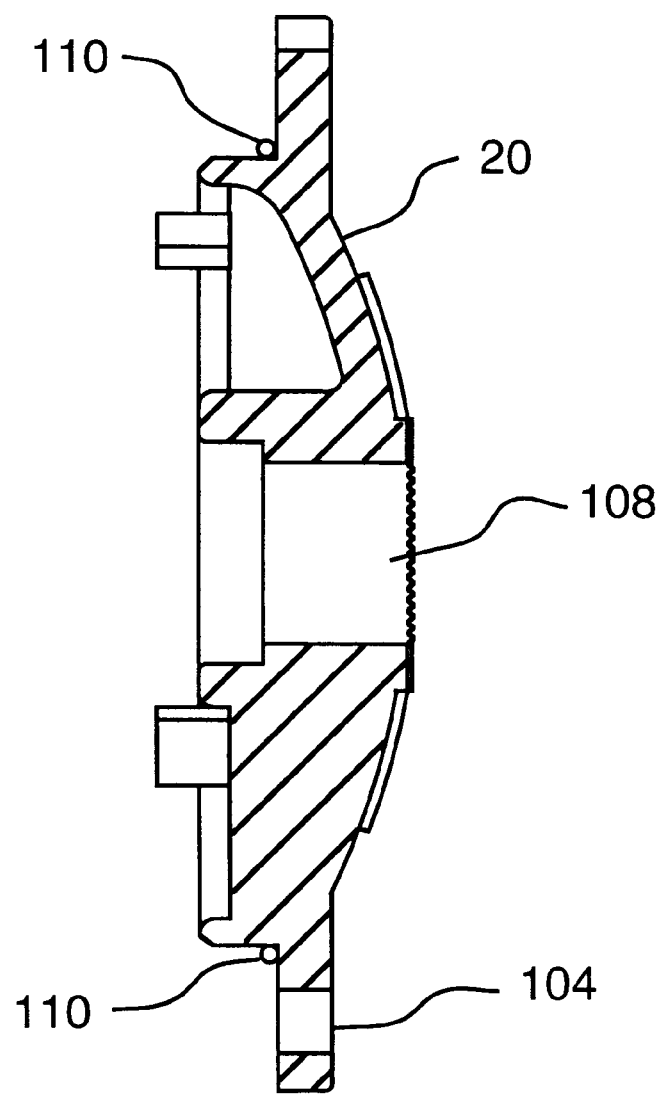
FIG. 26 is a cross-sectional view of the cover of FIGS. 23–25, taken along line XXVI—XXVI in FIG. 23.

Also, in an embodiment shown in FIG. 22, the diverters 26 and 28 may each include a seal 90 and retainer plate 96 for improved engagement with the seat 44 of the coupling member (32, 34). In such a case, the diverter (26, 28) may have an upstanding rim 82 that extends around the perimeter of a face 84 to define a seal-receiving recess 86 therein. Two pin-receiving cavities 88 are also preferably provided in the face 84 of the diverter (26, 28). The seal 90 may be fabricated from a material that is compatible with the type of fluid flowing through the valve, such as, for example, silicone with a Teflon® laminate, and may be attached to the diverter (26, 28) by the seal retainer plate 96. To facilitate such attachment, an opening 98 may be provided through the seal 90. Two bosses or pins 102 may protrude from the underside of the seal retainer plate 96 for receipt in the corresponding cavities 88. Thus, in one embodiment, the seal 90 is placed in the seal-receiving cavity 88 in the diverter (26, 28) and is retained therein by inserting the pins 102 of the seal retainer plate 96 into the pin-receiving cavities 88. The diverter (26, 28) and seal retainer plate 96 may be fabricated from thirty percent glass-filled Noryl and the pins 102 may be retained within the cavities 88 by ultrasonic welding. The skilled appreciate, however, that the seal 90 could be formed from other materials and could be attached to the diverter (26, 28) by various other means.

One or more O-ring seals 100 may be disposed on the primary or auxiliary stems (74, 76, 78) to prevent leakage between the stems (74, 76, 78) and the corresponding valve bodies (22, 24) or cover 20. The skilled artisan will also recognize that a ball, disk or other flow control member may be successfully utilized in the present invention in place of the diverter 26 and 28 discussed hereinabove.

FIGS. 23–26 illustrate a cover 20 for fluid tight connection to a valve body flange 46 and for actuator connection purposes. The cover 20 contains holes 104 arranged to correspond to the threaded holes 50 of a valve body (22, 24). Bolts 106 extend through the cover holes 104 to be received in the threaded holes 50 of the valve body (22, 24). A diverter stem hole 108 is provided through which a primary diverter stem 74 extends for connection to an actuator (not shown). A sealing ring 110 may be received within a groove 112 in the valve body (22, 24) to achieve a fluid-tight seal between the valve body (22, 24) and cover 20. Actuator mounting tabs 114 are also provided so that a compatible actuator may be rigidly mounted on the cover 20. The skilled artisan will recognize that many known forms of manual or automatic actuation may be utilized with the present invention. The skilled artisan will also recognize that other mounting means may be provided on the cover 20 to accommodate the chosen form of actuation.

Common actuation of all diverters 26 and 28 may be accomplished by way of a single actuator attached to the primary stem 74 of the diverter 26 that extends through the cover 20. As previously discussed, the diverters 26 and 28 may be positioned in the adaptor 18 in a variety of configurations in order to accommodate the flow requirements of the piping system. Once the diverters 26 and 28 and adaptor 18 have been interconnected, however, all of the diverters 26 and 28 will turn together. For example in a dual valve arrangement, the first diverter 26 may be interconnected relative to the second diverter 28 such that when the actuator (not shown) is rotated, the first diverter 26 prevents fluid flow through the ports 38 in its corresponding valve body 22, while the second diverter 28 permits fluid to flow through the ports 38 of its corresponding valve body 24. Common actuation of interconnected diverters 26 and 28 may thereby prevent system "dead heading" which may occur on separately actuated systems when there is either a failure of one actuator, or when actuators are not simultaneously actuated. "Dead heading" is a term commonly used in the fluid control industry that means to prevent any flow in the system. The skilled artisan will appreciate that the unique and novel construction of the present invention enables a myriad of flow control arrangements to be obtained.

Utilizing a single actuator to simultaneously actuate multiple diverters 26 and 28 or other flow control members can also provide cost and space savings. In particular, it will be appreciated that the cost of a single actuator capable of operating multiple diverters 26 and 28 is typically less than the cost of multiple actuators to be applied to each diverter (26, 28) separately and the labor cost associated with installing and adjusting a single actuator can be less than that associated with installing and adjusting multiple actuators.

Additional benefits may be realized by the efficient preconfiguration of multiple valve bodies 22 and 24 into a single unit prior to delivery to the installation site. The subject interconnected valve 10 may be preconfigured in many configurations utilizing common components, thereby reducing installation and layout time at the installation site. In addition to the varied preconfiguration permitted by the subject valve 10, the subject valve 10 also offers ease of reconfiguration in the field.

The additional feature of permitting fluid to flow through the adjoining member 16 of the subject valve 10 provides further improved efficiency both when preconfiguring and when reconfiguring the valve 10.

Those of ordinary skill in the art will recognize that many modifications and variations of the present invention may be implemented. The foregoing description and the following claims are intended to cover all such modifications and variations. Furthermore, the materials and processes disclosed are illustrative of the invention but are not exhaustive. Other materials and processes may also be used to utilize the present invention.

What is claimed is:

1. A valve, comprising:
   a pair of valve bodies, each said valve body having an annular chamber and at least one port therethrough;
   an adjoining member intermediate said valve bodies and removably attached thereto;
   a flow control member operably disposed in each said annular chamber of each said valve body; and
   a rotatable adaptor received within said adjoining member and engaging said flow control members, wherein said flow control member comprises a diverter sized to selectively substantially block at least one port in said valve body in which said flow control member is received, each said diverter having a diverter axis that is transverse to said actuation axis, and a stem protruding from said diverter for engagement with said adaptor.

2. The valve of claim 1, wherein said flow control members are each engagable with said adaptor in said adjoining member in a plurality of orientations about an actuation axis extending through said valve.

3. The valve of claim 1, wherein said stem of each said flow control member engages said adaptor such that said diverter axis of one said diverter is oriented 90° about said actuation axis relative to said diverter axis of the other said diverter.

4. The valve of claim 1, wherein said stem of each said flow control member engages said adaptor such that said diverter axis of one said diverter is oriented 180° about said actuation axis relative to said diverter axis of the other said diverter.

5. The valve of claim 1, wherein each said stem is splined and wherein said adaptor has a splined socket therein corresponding to each said stem for receipt therein.

6. The valve of claim 1, wherein each said diverter has a face for engagement with said valve body.

7. The valve of claim 6, wherein said face is arcuate.

8. The valve of claim 6 further comprising a seal attached to each said face.

9. The valve of claim 8, wherein said seal is removably attached to said face by a seal retainer plate affixed to said diverter.

10. The valve of claim 9, wherein each said seal is fabricated from silicone with a teflon® laminate.

11. The valve of claim 1, wherein said adjoining member engages said valve bodies in a plurality of orientations about an actuation axis extending through the valve.

12. The valve of claim 11, wherein said adjoining member adjustably engages said valve bodies at 45° angles about said actuation axis.

13. The valve of claim 1, wherein said adjoining member has a flow passage in fluid communication with said annular chambers of said valve bodies.

14. The valve of claim 1 also comprising a gasket disposed between each said valve body and said adjoining member.

15. The valve of claim 1, wherein each said diverter has another stem.

16. The valve of claim 15, wherein said another stem of one said diverter is engageable by an actuator.

17. A valve, having an actuating axis, comprising:
   a first valve body, said first valve body having an annular chamber and at least one port, said annular chamber extending from a first flange to a second flange and coaxially aligned with said actuating axis;
   a second valve body, said second valve body having an annular chamber and at least one port, said annular chamber extending from a first flange to a surface and coaxially aligned with said actuating axis;
   a first flow control member disposed in said annular chamber of said first valve body, said first flow control member being coaxially aligned with, and rotatable along, said actuating axis;
   a second flow control member disposed in said annular chamber of said second valve body, said second flow control member being coaxially aligned with, and rotatable along, said actuating axis;
   an adjoining member coaxially aligned with said actuating axis and connected to said second flange of said first valve body and said first flange of said second valve body;

an adaptor, corresponding to each said adjoining member and housed therein, said adaptor being coaxially aligned with, and rotatable along, said actuating axis, said adaptor connected to said first flow control member and said second flow control member; and a cover connected to said first flange of said first valve body.

18. The valve of claim 17, further comprising at least one additional valve body, wherein each pair of valves is connected by an adjoining member in a series configuration.

19. A valve comprising:

at least two valve bodies; and means for connecting said at least two valve bodies wherein each valve body may be removed from said connecting means, wherein said valve has an actuating axis, and each said valve body is coaxially aligned with said actuating axis such that each said valve body is engageable with said means for connecting in a plurality of orientations, and wherein each said valve body has an annular chamber and said connecting means has a flow passage in fluid communication with said annular chambers.

20. The valve of claim 19, wherein said each valve body has at least one port and includes means for preventing fluid flow through said port.

21. The valve of claim 19, wherein said valve has an actuating axis and each valve body has at least one port, further comprising:

first means for preventing fluid flow through said at least one port of said first valve body, said first means being coaxially aligned with said actuating axis; and second means for preventing fluid flow through said at least one port of said second valve body, said second means being coaxially aligned with said actuating axis and said first means and said second means being mutually engageable in a plurality of orientations about said actuating axis.

22. A flow control assembly for a valve having two ported valve bodies, said flow control assembly comprising:

a flow control member operably supportable in one of the valve bodies, said flow control member having at least one actuator stem;

another said flow control member operably supportable in the other valve body, said another said flow control member having at least one actuator stem; and a connector extending between the valve bodies and attachable thereto, said connector engaging one of said actuator stems on said flow control member and one of said actuator stems on said another flow control member.

23. The flow control assembly of claim 22, wherein said actuator stems of said flow control member and said another flow control member are coaxially aligned along an actuation axis and wherein said connector is removably attachable to the valve bodies at a plurality of orientations about said actuation axis.

24. The flow control assembly of claim 22, further comprising an adaptor housed within said connector for engagement with one of said stems on said flow control member and said another flow control member.

25. The flow control assembly of claim 24, wherein said actuator stems of said flow control member and said another flow control member are coaxially aligned along an actuation axis.

26. The flow control assembly of claim 25, wherein one said actuator stem of said flow control member and one said actuator stem of said another flow control member are each engageable with said adaptor at a plurality of orientations about said actuation axis.

27. The flow control assembly of claim 26, wherein said adaptor has two coaxially-aligned cavities therein, each said cavity having spines therein and wherein at least one said actuator of said flow control member is splined for non-rotatable receipt in one of said cavities in said adaptor and wherein at least one of said actuator stems of said another flow control member is splined for non-rotatable receipt in another said cavity in said adaptor.

28. The flow control assembly of claim 22, wherein each said flow control member has a face portion adapted to selectively block at least one port in the valve body in which it is received.

29. The flow control assembly of claim 28, further comprising a seal attached to said face of each said flow control member.

30. The flow control assembly of claim 29, wherein each said seal is removably attached to a corresponding face by a corresponding retainer plate.

31. The flow control assembly of claim 22, wherein said connector has a flow passage therethrough for permitting a fluid to flow therethrough from one valve body to the other valve body.

32. A valve, comprising:

a pair of valve bodies, each said valve body having an annular chamber and at least one port therethrough;

an adjoining member intermediate said valve bodies and removably attached thereto;

a flow control member operably disposed in each said annular chamber of each said valve body; and a rotatable adaptor received within said adjoining member and adjustably engaging said flow control members at 90° angles about an actuation axis extending through said valve.

33. A valve, comprising:

a pair of valve bodies, each said valve body having an annular chamber, a valve axis, and at least one port therethrough, said port having a port axis perpendicular to said valve axis;

an adjoining member intermediate said valve bodies and removably attached thereto; and a flow control member operably and removably disposed in each said annular chamber of each said valve body.

34. The valve of claim 33, further comprising a rotatable adaptor received within said adjoining member and engaging said flow control members.

35. The valve of claim 34, wherein said flow control members are each engagable with said adaptor in said adjoining member in a plurality of orientations about an actuation axis extending through said valve.

36. The valve of claim 35, wherein said adaptor adjustably engages said flow control members at 90° angles about said actuation axis.

37. The valve of claim 34, wherein said flow control member comprises:

a diverter sized to selectively substantially block at least one port in said valve body in which said flow control member is received, each said diverter having a diverter axis that is transverse to said actuation axis; and a stem protruding from said diverter for engagement with said adaptor.

38. The valve of claim 37, wherein said stem of each said flow control member engages said adaptor such that said diverter axis of one said diverter is oriented 90° about said actuation axis relative to said diverter axis of the other said diverter.

39. The valve of claim 37, wherein said stem of each said flow control member engages said adaptor such that said diverter axis of one said diverter is oriented 180° about said actuation axis relative to said diverter axis of the other said diverter.

40. The valve of claim 37, wherein each said stem is splined and wherein said adaptor has a splined socket therein corresponding to each said stem for receipt therein.

41. The valve of claim 37, wherein each said diverter has a face for engagement with said valve body.

42. The valve of claim 41, wherein said face is arcuate.

43. The valve of claim 42, further comprising a seal attached to each said face.

44. The valve of claim 43, wherein said seal is removably attached to said face by a seal retainer plate affixed to said diverter.

45. The valve of claim 44, wherein each said seal is fabricated from silicone with a teflon® laminate.

46. The valve of claim 33, wherein said adjoining member engages said valve bodies in a plurality of orientations about an actuation axis extending through the valve.

47. The valve of claim 46, wherein said adjoining member adjustably engages said valve bodies at 45° angles about said actuation axis.

48. The valve of claim 33, wherein said adjoining member has a flow passage in fluid communication with said annular chambers of said valve bodies.

49. The valve of claim 33, also comprising a gasket disposed between each said valve body and said adjoining member.

50. The valve of claim 37, wherein each said diverter has another stem.

51. The valve of claim 50, wherein said another stem of one said diverter is engageable by an actuator.

52. A valve comprising:
at least two valve bodies, said each valve body having a valve axis and at least one port having a port axis perpendicular to said valve axis, said each valve body including removable means for preventing fluid flow through said at least one port; and
means for connecting said at least two valve bodies wherein said each valve body may be removed from said connecting means.

53. The valve of claim 52, wherein said valve has an actuating axis, and said removable means for preventing fluid flow through said at least one port of said each valve body are coaxially aligned with said actuating axis and are mutually engageable in a plurality of orientations about said actuating axis.

54. The valve of claim 52, wherein said each valve body has an annular chamber and said connecting means has a flow passage in fluid communication with said annular chambers.

55. A valve, comprising:
a pair of valve bodies, said each valve body having an annular chamber and at least one port therethrough;
an adjoining member intermediate said valve bodies and removably attached thereto, said adjoining member having a flow passage in fluid communication with said annular chambers of said valve bodies; and
a flow control member operably disposed in each said annular chamber of said each valve body.

56. A valve assembly, comprising:
a first valve body having at least two first ports therethrough, said first valve body having at least one first coupling member attached thereto, each said first coupling member corresponding to one of said first ports and having a first seat thereon;
a first flow control member operably disposed within said first valve body and oriented therein to selectively sealingly engage said first seats on each said first coupling member;
a second valve body having at least two second ports extending therethrough;
a second flow control member operably disposed within said second valve body;
an adjoining member interconnecting said first and second valve bodies; and
an adapter housed within said adjoining member and interconnecting said first and second flow control members together, said adapter defining an actuation axis about which said first and second flow control members are selectively rotatable.

57. The valve assembly of claim 56 wherein said second valve body has at least one coupling member attached thereto, each said second coupling member corresponding to one of said second ports and having a second seat thereon for selective sealing engagement with said second flow control member.

58. The valve assembly of claim 56 wherein said first valve body has a removable cover attached thereto.

59. The valve assembly of claim 58 wherein said second valve body has a second cover attached thereto.

60. A method of reorienting flow control members of interconnected valves, comprising:
interconnecting a first valve body that operably houses a first flow control member therein to a second valve body that operably houses a second flow control member therein such that the first and second flow control members are operably interconnected in respective first positions and selectively rotatable about a common axis; and
reorienting the first flow control member to a second position while retaining the second flow control member in the respective first position and without detaching the first valve body from the second valve body.

61. The method of claim 60 wherein said interconnecting comprises:
removably interconnecting a portion of each of the first and second flow control members in their respective first positions to an adapter; and
housing the adapter within an intermediate adjoining member attached to the first and second valve bodies.

62. The method of claim 61 wherein the first valve body has a first removable cover attached thereto and wherein said reorienting comprises:
removing the first removable cover from the first valve body;
detaching the first flow control member from the adapter;
reorienting the first flow control member to the second position;
reconnecting the first flow control member to the adapter in the second position; and
reattaching the first cover to the first valve body.

63. The method of claim 62 further comprising reorienting the second flow control member to a second position.

64. The method of claim 63 wherein the second valve body has a removable cover attached thereto and said reorienting the second flow control member comprises:
removing the second removable cover from the second valve body;
detaching the second flow control member from the adapter;
reorienting the second flow control member to the second position;
reconnecting the second flow control member to the adapter in the second position; and
reattaching the second cover to the first valve body.

* * * * *